US 11,586,068 B2

(12) United States Patent
Chiu et al.

(10) Patent No.: US 11,586,068 B2
(45) Date of Patent: Feb. 21, 2023

(54) DISPLAY APPARATUS

(71) Applicant: Au Optronics Corporation, Hsinchu (TW)

(72) Inventors: Min-Hsuan Chiu, Hsinchu (TW); Chih-Hao Chen, Hsinchu (TW); Seok-Lyul Lee, Hsinchu (TW); Syuan-Ling Yang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/666,562

(22) Filed: Feb. 8, 2022

(65) Prior Publication Data

US 2022/0163847 A1    May 26, 2022

Related U.S. Application Data

(63) Continuation of application No. 16/999,071, filed on Aug. 21, 2019, now Pat. No. 11,287,688.

(30) Foreign Application Priority Data

Mar. 2, 2020    (TW) .................. 109106705

(51) Int. Cl.
*G02F 1/13357*    (2006.01)
*G02F 1/1335*    (2006.01)
*G02F 1/1337*    (2006.01)
*G02F 1/1347*    (2006.01)

(52) U.S. Cl.
CPC ...... *G02F 1/133602* (2013.01); *G02F 1/1337* (2013.01); *G02F 1/1347* (2013.01); *G02F 1/133512* (2013.01); *G02F 1/133528* (2013.01)

(58) Field of Classification Search
None
See application file for complete search history.

(56) References Cited

U.S. PATENT DOCUMENTS

| 8,446,548 B2 | 5/2013 | Uehara |
| 10,782,545 B2 | 9/2020 | Smith |
| 11,287,688 B2 * | 3/2022 | Chiu ................ G02F 1/133602 |

(Continued)

FOREIGN PATENT DOCUMENTS

| CN | 101075040 | 11/2007 |
| CN | 102998861 | 3/2013 |
| CN | 110501824 | 11/2019 |

*Primary Examiner* — Shan Liu
(74) *Attorney, Agent, or Firm* — JCIPRNET

(57) ABSTRACT

A display apparatus includes a backlight source, a privacy filter disposed on the backlight source, a light adjusting panel disposed on the privacy filter, and a display panel disposed on the light adjusting panel. The light adjusting panel includes a first substrate, a first electrode, a second electrode, a first vertical alignment film disposed on the first substrate, a second substrate disposed opposite to the first substrate, a second vertical alignment film disposed on the second substrate, and a positive liquid crystal layer disposed between the first vertical alignment film and the second vertical alignment film. The first electrode and the second electrode are disposed on the first substrate. Here, the first electrode has a plurality of first slits, and a plurality of orthogonal projections of the first slits on the first substrate overlap an orthogonal projection of the second electrode on the first substrate.

17 Claims, 15 Drawing Sheets

(56) References Cited

U.S. PATENT DOCUMENTS

| | | | |
|---|---|---|---|
| 2005/0259193 A1* | 11/2005 | Sumiyoshi | G02F 1/1323 349/62 |
| 2007/0268427 A1* | 11/2007 | Uehara | G02B 6/0038 349/86 |
| 2009/0066891 A1* | 3/2009 | Woo | G02F 1/133707 349/110 |
| 2012/0176575 A1* | 7/2012 | Matsumoto | G02F 1/1337 349/123 |
| 2014/0111716 A1* | 4/2014 | Tsao | G02F 1/134363 349/123 |
| 2015/0153619 A1* | 6/2015 | Murata | G02F 1/137 349/123 |
| 2018/0119013 A1* | 5/2018 | Saito | G02F 1/1341 |
| 2019/0353943 A1* | 11/2019 | Smith | G02F 1/134309 |
| 2021/0055582 A1* | 2/2021 | Chen | G02F 1/133626 |

* cited by examiner

DISPLAY APPARATUS

CROSS-REFERENCE TO RELATED APPLICATION

This application is a continuation application of and claims the priority benefit of U.S. application Ser. No. 16/999,071, filed on Aug. 21, 2020, now allowed, which claims the priority benefit of Taiwan patent application serial no. 109106705, filed on Mar. 2, 2020. The entirety of each of the above-mentioned patent applications is hereby incorporated by reference here and made a part of this specification.

BACKGROUND

Technical Field

The disclosure relates to a photoelectric device, and in particular to a display apparatus.

Description of Related Art

Existing display apparatuses have advantages of light weight, compactness, and energy efficiency and have been widely applied in various electronic products, such as televisions, desktop PCs, smartphones, notebook computers, and tablet PCs. With the development of display technologies and the public concerns about privacy, privacy filtering technologies of the display apparatus has drawn more and more attention, and thus research and development personnel spares no effort to develop the privacy filtering technologies.

In order to be adapted to different occasions, the display apparatus is required to switch between a privacy mode and a sharing mode. Generally, the display apparatus achieves said switching function by means of an internal tunable scattering film. However, the current manufacturing process of the tunable scattering film process is complicated and is unreliable.

SUMMARY

The disclosure provides a display apparatus with favorable performance and reliability.

According to an embodiment of the disclosure, a display apparatus includes a backlight source, a privacy filter, a light adjusting panel, and a display panel. The privacy filter is disposed on the backlight source. The light adjusting panel is disposed on the privacy filter. The display panel is disposed on the light adjusting panel. The light adjusting panel includes a first substrate, a first electrode, a second electrode, a first vertical alignment film, a second substrate, a second vertical alignment film, and a positive liquid crystal layer. The first electrode and the second electrode are disposed on the first substrate, wherein the first electrode has a plurality of first slits, and a plurality of orthogonal projections of the first slits on the first substrate overlap an orthogonal projection of the second electrode on the first substrate. The first vertical alignment film is disposed on first substrate. The second substrate is disposed opposite to the first substrate. The second vertical alignment film is disposed on second substrate. The positive liquid crystal layer is disposed between the first vertical alignment film and the second vertical alignment film.

In an embodiment of the disclosure, the privacy filter has a plurality of light blocking structures separated from each other, the first electrode of the light adjusting panel has a plurality of first branches that define the first slits, an angle between one of the light blocking structures of the privacy filter and one of the first branches of the first electrode of the light adjusting panel is α, and $0° \leq \alpha \leq 45°$.

In an embodiment of the disclosure, the display panel includes a non-self-luminous display medium layer and a polarizer that is disposed between the non-self-luminous display medium layer of the display panel and the positive liquid crystal layer of the light adjusting panel. The privacy filter has a plurality of light blocking structures separated from each other, an angle between the light blocking structure of the privacy filter and a transmission axis of the polarizer of the display panel is β, and $0° \leq \beta \leq 90°$.

In an embodiment of the disclosure, the first electrode of the light adjusting panel has a plurality of first branches, the second electrode of the light adjusting panel has a plurality of second branches, and the first branches and the second branches are alternately arranged in a first direction. A gap exists between one of the first branches and one of the second branches adjacent to each other. When the light adjusting panel is enabled, a curve indicating a relation between each location of the positive liquid crystal layer in the first direction and an equivalent refractive index of the positive liquid crystal layer has a plurality of peaks and a valley within a distance corresponding to a width of the gap.

In an embodiment of the disclosure, a positive liquid crystal molecule of the positive liquid crystal layer has a bi-refractive index $\Delta n$, and $0.11 \leq \Delta n \leq 0.25$ when a temperature is at 25° C. and a wavelength is 589.3 nanometers.

In an embodiment of the disclosure, the positive liquid crystal layer has a positive liquid crystal molecule; when the light adjusting panel is disabled, the display apparatus is in a privacy mode, and a long axis of the positive liquid crystal molecule is substantially perpendicular to the first substrate.

In an embodiment of the disclosure, when the light adjusting panel is enabled, the display apparatus is in a sharing mode, a potential difference between the first electrode and second electrode of the light adjusting panel is $\Delta V$, and $4V \leq \Delta V \leq 15V$.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
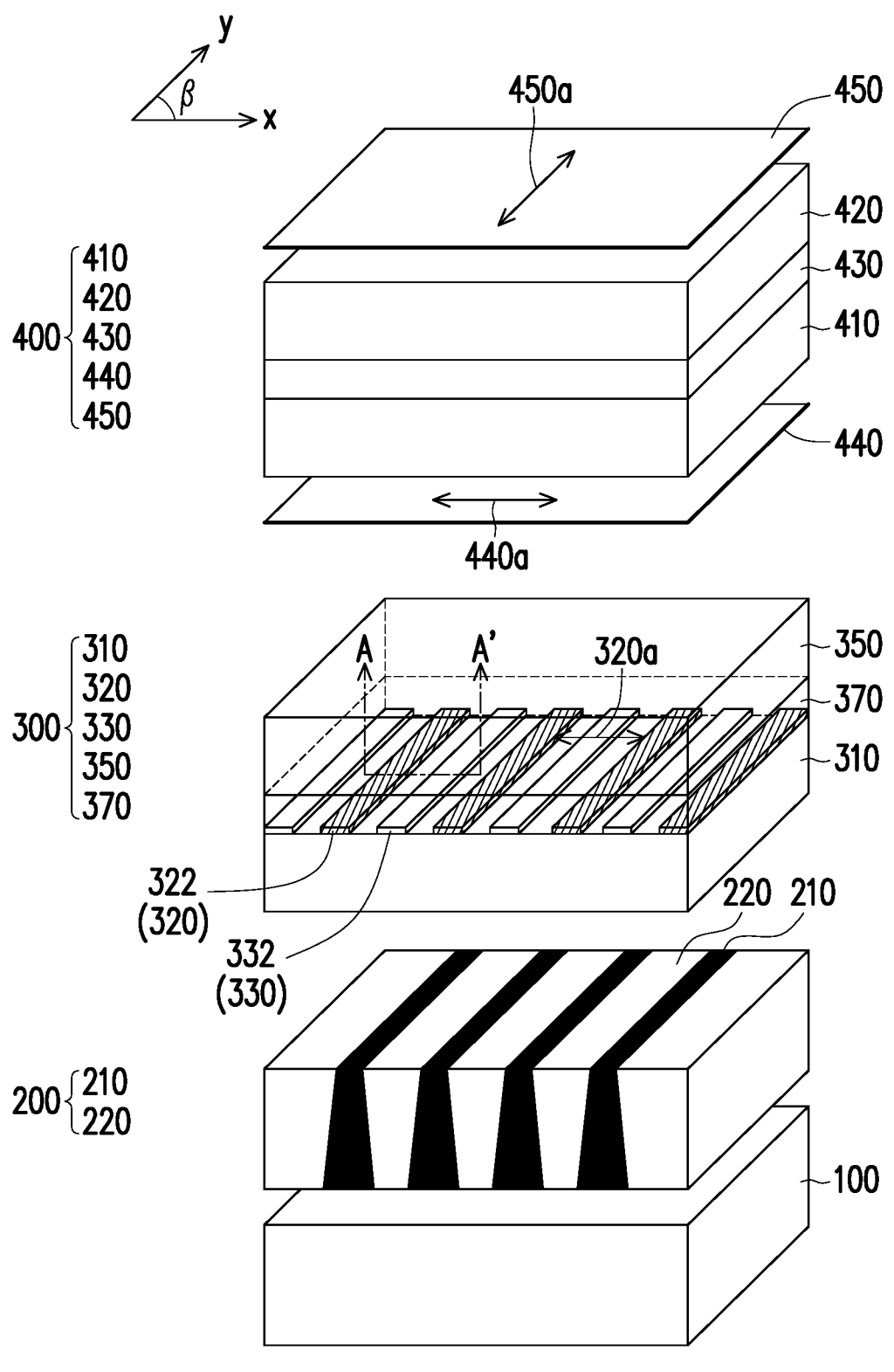
FIG. 1 is a schematic three-dimensional view of a display apparatus 10 according to a first embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Directional terminology used in the embodiments, such as "top", "bottom", "front", "back", "left", "right", etc., is used with reference to the orientation of the figure(s) being described and are not intended to be limiting of the disclosure. In the drawings, general characteristics of methods, structures, and/or materials used in specific embodiments are illustrated. However, these drawings should not be construed to define or limit a scope or nature covered by these embodiments. For instance, for simplicity's sake, a relative size, thickness, and location of each film layer, region, and/or structure may be reduced or enlarged. It will be understood that when a component such as a layer, a film, a region, or a substrate is referred to be "on" or "connected to" another component, it may be directly on or connected to the other another component, or intermediate components may also exist there between. Comparatively, when a component is referred to be "directly on" or "directly connected" to another, none other intermediate component exits there between. As used herein, the "connection" may refer to physical and/or electrical connection. Furthermore, "electrical connection" or "coupling" of two components may refer to that other components may exist between the two components.

In the embodiments listed in the disclosure, the same or similar components be denoted by the same or similar reference numerals, and descriptions thereof will be omitted. In addition, the features in different embodiments may be combined with each other in case of no conflict, and simple equivalent changes and modifications made according to the specification or a scope of the patent application are still within a protection scope of the patent. Moreover, the terms "first" and "second" mentioned in the specification or the scope of the patent application are only used to name discrete components or to distinguish different embodiments or ranges, but are not used to limit an upper limit or a lower limit of an amount of the components, and are also not used to limit a manufacturing sequence or a setting sequence of the components.

"About", "approximate", or "substantial" used in the specification includes a stated value and an average value within an acceptable deviation range from a specific value determined by those with ordinary skills in the art while considering the discussed measurement and a specific number of errors associated with the measurement (i.e. limits of a measurement system) For instance, "about" may represent to be within one or more standard deviations of the stated value, or within ±30%, ±20%, ±10%, and ±5%. Moreover, an acceptable deviation range or standard deviation may be selected for the "about", "approximate" or "substantial" used in the specification based on optical properties, etching properties, or other properties without using one standard deviation for all properties.

FIG. 1 is a schematic three-dimensional view of a display apparatus 10 according to a first embodiment of the disclosure.

With reference to FIG. 1, the display apparatus 10 includes a backlight source 100, a privacy filter 200 disposed on the backlight source 100, a light adjusting panel 300 disposed on the privacy filter 200, and a display panel 400 disposed on the light adjusting panel 300.

The backlight source 100 is configured to emit an illumination beam (not shown). After the illumination beam passes through the privacy filter 200, the divergence degree of the illumination beam decreases, i.e., the collimation degree of the illumination beam increases. The backlight source 100 and the privacy filter 200 may constitute a collimated backlight module.

For instance, in the embodiment, the backlight source 100 may be a planar light source, and the planar light source may include a plurality of components, such as light-emitting diodes (LEDs), light guide plates, and optical films, which should however not be construed as a limitation in the disclosure.

For instance, in the embodiment, the privacy filter 200 includes a privacy structure layer which has a plurality of light blocking structures 210 and a plurality of transparent materials 220. The light blocking structures 210 and the transparent materials 220 are alternately arranged in a first direction x, and one of the transparent material 220s is provided between two adjacent light blocking structures 210 to separate the light blocking structures 210. In the embodiment, each of the light blocking structures 210 may be a columnar structure extending in a second direction y, where the first direction x and the second direction y are interlaced with each other. However, the disclosure is not limited thereto, and in other embodiments, the privacy filter 200 may have a different structure.

Figure 2:
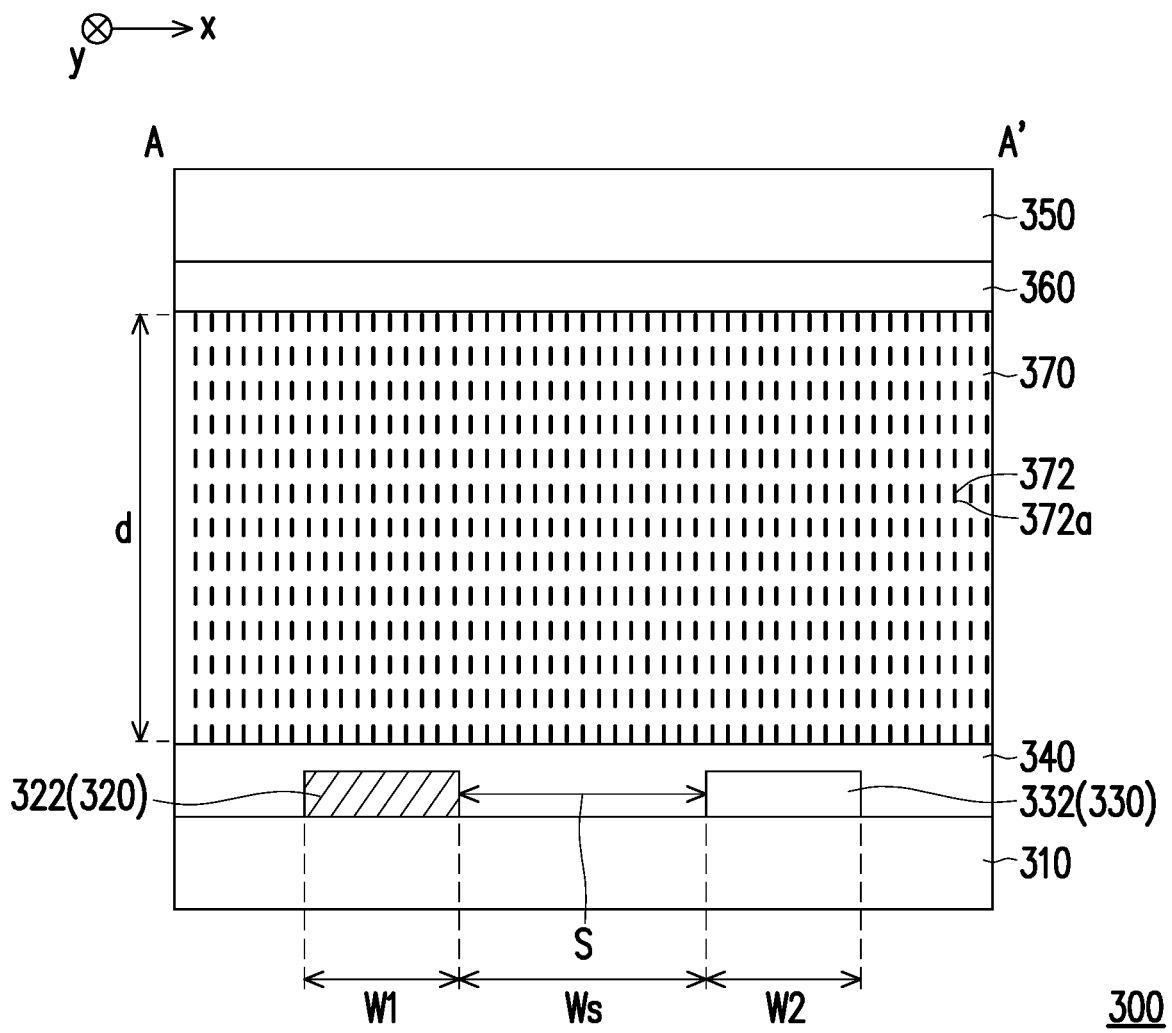
FIG. 2 is a schematic cross-sectional view of a light adjusting panel 300 according to the first embodiment of the disclosure.

FIG. 2 is a schematic cross-sectional view of a light adjusting panel 300 according to the first embodiment of the disclosure.

FIG. 2 corresponds to a line segment A-A' in FIG. 1. A first vertical alignment film 340 and a second vertical alignment film 360 in FIG. 2 are omitted in FIG. 1.

With reference to FIG. 1 and FIG. 2, the light adjusting panel 300 is disposed on the privacy filter 200. The light adjusting panel 300 includes a first substrate 310. The first substrate 310 is a transparent substrate. For instance, in the embodiment, a material of the first substrate 310 may be glass, quartz, an organic polymer, or any other appropriate material.

The light adjusting panel 300 also includes a first electrode 320 and a second electrode 330 that are disposed on the first substrate 310. The first electrode 320 has a plurality of first slits 320a, and a plurality of orthogonal projections of the first slits 320a on the first substrate 310 overlap an orthogonal projection of the second electrode 330 on the first substrate 310.

For instance, in the embodiment, the first electrode 320 has a plurality of first branches 322 that define the first slits 320a, and the second electrode 330 has a plurality of second branches 332, and the first branches 322 and the second branches 332 are alternately arranged in the first direction x and extend in the second direction y. An orthogonal projection of one of the first slits 320a defined by two adjacent first branches 322 on the first substrate 310 overlaps an orthogonal projection of one of the second branches 332 on the first substrate 310. In the embodiment, the first branches 322 and the second branches 332 may be substantially disposed on the same surface, which should however not be construed as a limitation in the disclosure.

In the embodiment, a plurality of gaps S (shown in FIG. 2) exist between the first branches 322 and the second branches 332, and each of the gaps S is located between one of the first branches 322 and one of the second branches 332 adjacent to each other. For instance, in the embodiment, a width W1 of the first branch 322 in the first direction x and a width W2 of the second branch 332 in the first direction x may be substantially the same, and widths Ws of the gaps S in the first direction x may be substantially the same. For instance, in the embodiment, W1=W2=3 µm, and Ws=4 µm, which should however not be construed as a limitation in the disclosure.

As shown in FIG. 1, an angle between one of the first branches 322 of the first electrode 320 of the light adjusting panel 300 and one of the light blocking structures 210 of the privacy filter 200 is α (not shown), and $0° \leq \alpha \leq 45°$, preferably 10°. For instance, in the embodiment, the included angle α may be substantially 0°. That is to say the first branch 322 of the first electrode 320 of the light adjusting panel 300 and the light blocking structure 210 of the privacy filter 200 may be substantially parallel, which should however not be construed as a limitation in the disclosure.

The first electrode 320 and the second electrode 330 are transparent. For instance, in the embodiment, a material of the first electrode 320 and/or the second electrode 330 may be metal oxide, for instance: indium tin oxide, indium zinc oxide, aluminum tin oxide, aluminum zinc oxide, indium germanium zinc oxide, any other appropriate oxide, or a stacked layer having at least two of the above-mentioned materials, which should not be construed as a limitation in the disclosure.

As shown FIG. 2, it should be mentioned that the light adjusting panel 300 further includes a first vertical alignment film 340 that is disposed on the first substrate 310 and covers the first electrode 320 and the second electrode 330. The first vertical alignment film 340 is configured to provide anchoring energy, so that long axes 372a of positive liquid crystal molecules 372 of a positive liquid crystal layer 370 near the first vertical alignment film 340 are substantially perpendicular to the first substrate 310.

The light adjusting panel 300 also includes a second substrate 350 disposed opposite to the first substrate 310. The second substrate 350 is a transparent substrate. For instance, in the embodiment, a material of the second substrate 350 may be glass, quartz, an organic polymer, or any other appropriate material.

With reference to FIG. 2, it is worth noting that the light adjusting panel 300 also includes a second vertical alignment film 360 that is disposed on the second substrate 350. The second vertical alignment film 360 is configured to provide anchoring energy, so that the long axes 372a of the positive liquid crystal molecules 372 of the positive liquid crystal layer 370 near the second vertical alignment film 360 are substantially perpendicular to the second substrate 350.

The light adjusting panel 300 also includes the positive liquid crystal layer 370 that is disposed between the first vertical alignment film 340 and the second vertical alignment film 360. For instance, in the embodiment, the positive liquid crystal molecule 372 of the positive liquid crystal layer 370 has a bi-refractive index Δn, and when a temperature is at 25° C. and a wavelength is 589.3 nanometers, $0.11 \leq \Delta N \leq 0.25$.

As shown in FIG. 1, the display panel 400 is disposed on the light adjusting panel 300. For instance, in the embodiment, the display panel 400 includes a third substrate 410, a fourth substrate 420 disposed opposite to the third substrate 410, a non-self-luminous display medium layer 430 disposed between the third substrate 410 and the fourth substrate 420, a polarizer 440, and a polarizer 450. Here, the polarizer 440 and the polarizer 450 are respectively disposed on opposite sides of the non-self-luminous display medium layer 430, and a transmission axis 440a of the polarizer 440 and a transmission axis 450a of the polarizer 450 are substantially perpendicular to each other, which should however not be construed as a limitation in the disclosure.

The third substrate 410 and the fourth substrate 420 of the display panel 400 are transparent. For instance, in the embodiment, the third substrate 410 may be a pixel array substrate, and the fourth substrate 420 may be a color filter substrate, which should however not be construed as limitations in the disclosure. In the embodiment, the non-self-luminous display medium layer 430 is, for instance, a liquid crystal layer, which should not be construed as a limitation in the disclosure.

The polarizer 440 is disposed between the non-self-luminous display medium layer 430 of the display panel 400 and the positive liquid crystal layer 370 of the light adjusting panel 300. In the embodiment, an angle between one of the light blocking structures 210 of the privacy filter 200 and the transmission axis 440a of the polarizer 440 of the display panel 400 is β, and 0°≤β≤90°. For instance, in the embodiment, the angle β may be substantially 90°. That is, in the embodiment, the transmission axis 440a of the polarizer 440 and the light blocking structure 210 of the privacy filter 200 may be substantially vertical, and the transmission axis 440a of the polarizer 440 and the first branch 322 of the first electrode 320 of the light adjusting panel 300 may be substantially vertical, which should however not be construed as limitations in the disclosure.

FIG. 2 illustrates that the light adjusting panel 300 is in a disabled state.

Figure 3:
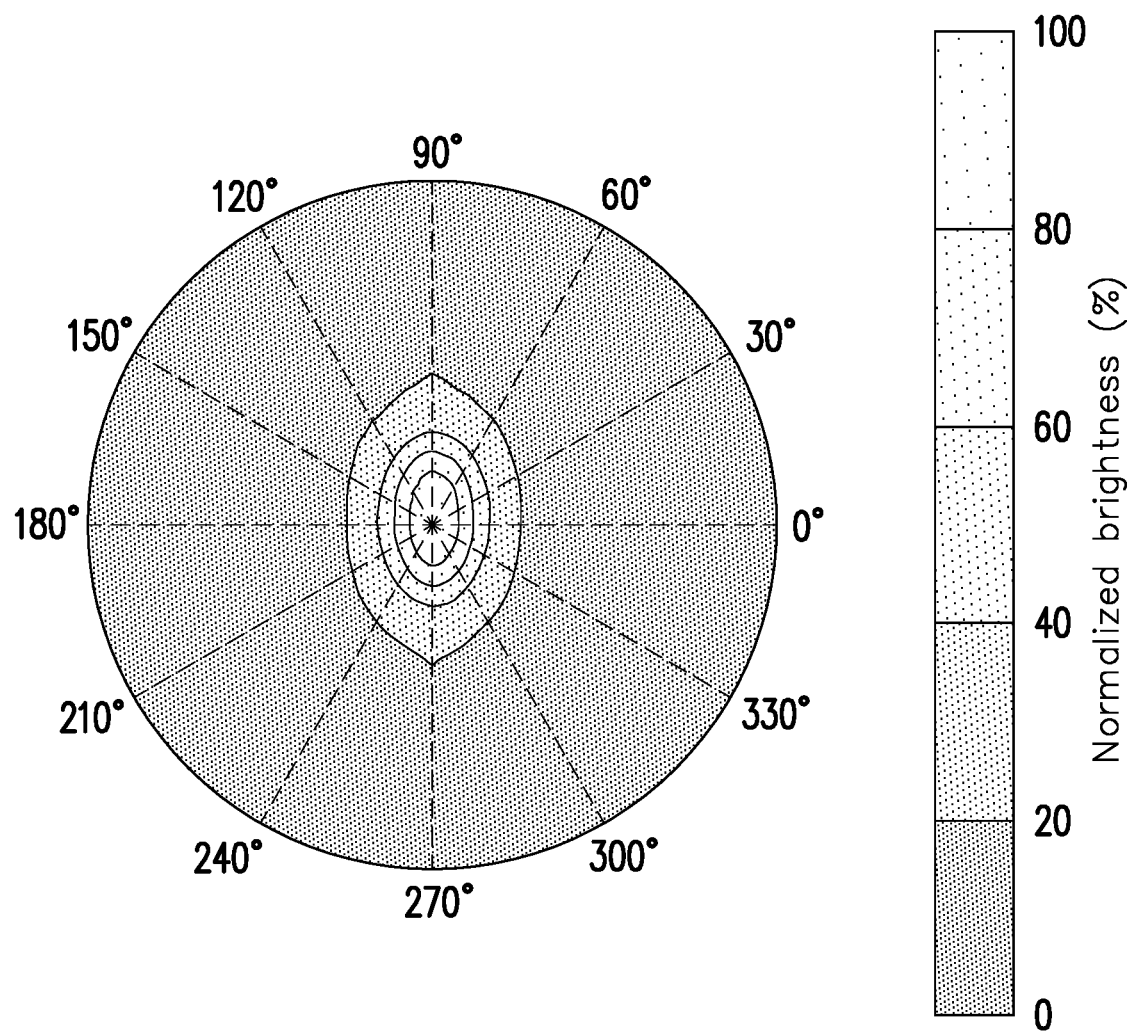
FIG. 3 illustrates the relationship between each view angle and a normalized brightness of the display apparatus 10 when the light adjusting panel 300 is disabled according to the first embodiment of the disclosure.

FIG. 3 illustrates the relationship between each view angle and a normalized brightness of the display apparatus 10 when the light adjusting panel 300 is disabled according to the first embodiment of the disclosure.

Figure 4:
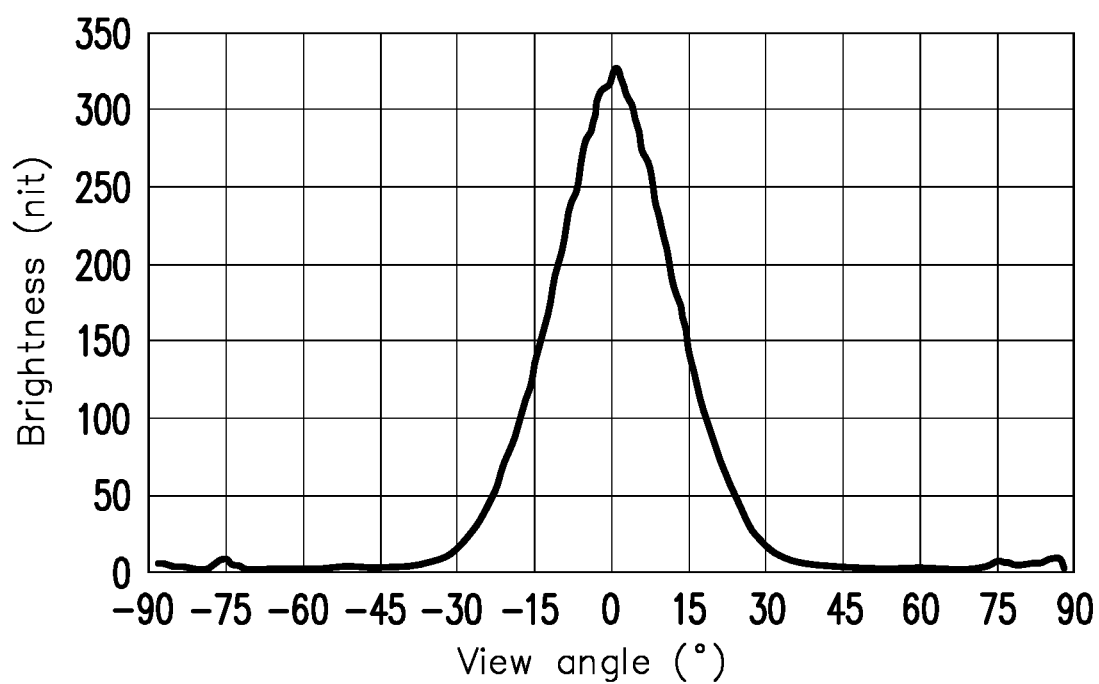
FIG. 4 illustrates the relationship between each view angle and a brightness of the display apparatus 10 in a first direction x when the light adjusting panel 300 is disabled according to the first embodiment of the disclosure.

FIG. 4 illustrates the relationship between each view angle and a brightness of the display apparatus 10 in a first direction x when the light adjusting panel 300 is disabled according to the first embodiment of the disclosure.

With reference to FIG. 1 and FIG. 2, when the light adjusting panel 300 is disabled (i.e., a potential difference M between the first electrode 320 and the second electrode 330 is substantially 0 volt, and an electric field between the first electrode 320 and the second electrode 330 is unable to significantly tilt the long axes 372a of the positive liquid crystal molecules 372 down), the long axes 372a of most of the positive liquid crystal molecules 372 in the light adjusting panel 300 are perpendicular to the first substrate 310. At this time, after the illumination beam (not shown) coming from the privacy filter 200 passes through the light adjusting panel 300 in the aforesaid state, the divergence degree of the illumination beam is not excessively changed by the light adjusting panel 300, and the illumination beam transmitted to the display panel 400 remains relatively collimated. Thus, as shown in FIG. 3 and FIG. 4, at the view angles of −90° to −45° and 45° to 90° in the first direction x, the brightness of the display apparatus 10 is close to 0 nit, and the display apparatus 10 is in a privacy mode.

Figure 5:
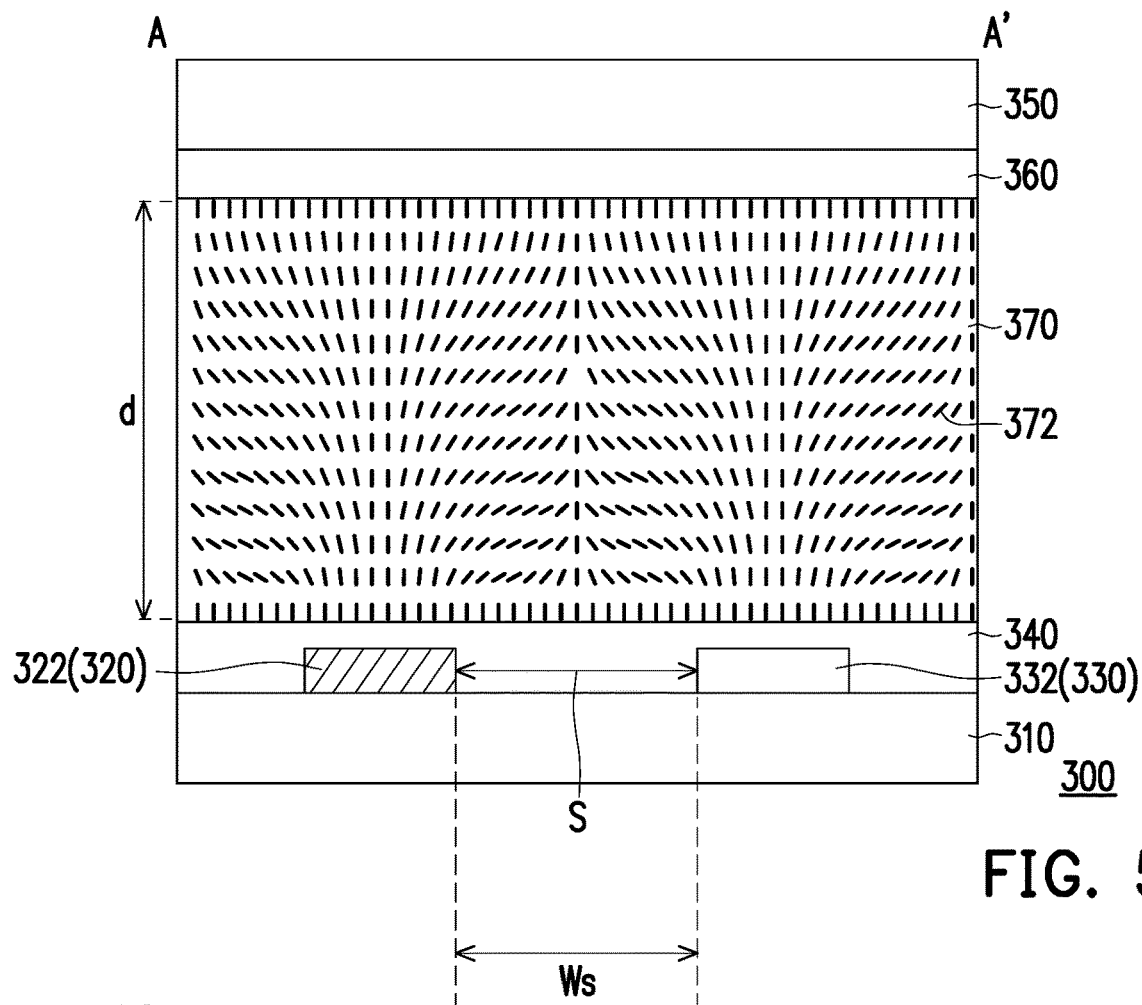
FIG. 5 is a schematic cross-sectional view of the light adjusting panel 300 according to the first embodiment of the disclosure.

FIG. 5 is a schematic cross-sectional view of the light adjusting panel 300 according to the first embodiment of the disclosure.

FIG. 5 corresponds to the line segment A-A' in FIG. 1. FIG. 5 illustrates that the light adjusting panel 300 is in an enabled state.

Figure 6:
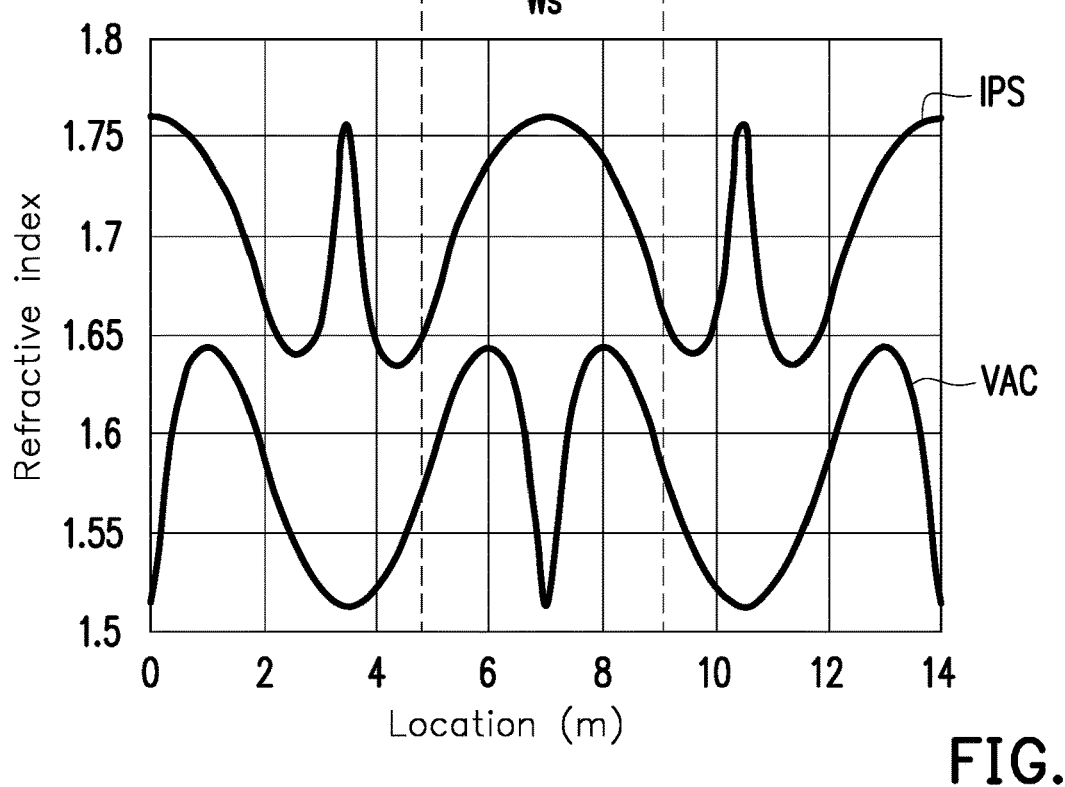
FIG. 6 illustrates a curve VAC indicating a relation between each location of a positive liquid crystal layer 370 of the light adjusting panel 300 in FIG. 5 in the first direction x and an equivalent refractive index of the positive liquid crystal layer 370.
Figure 7:
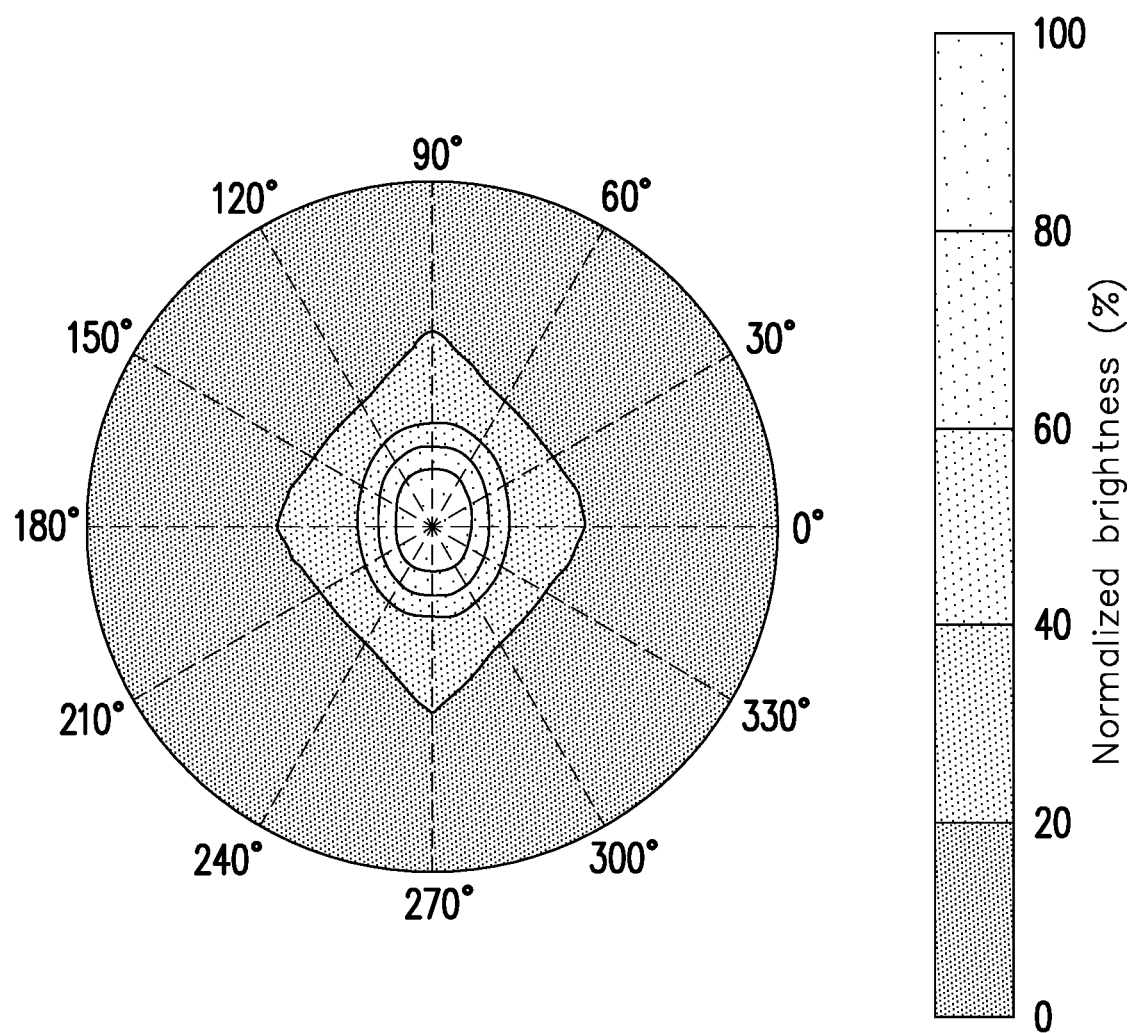
FIG. 7 illustrates the relationship between each view angle and the normalized brightness of the display apparatus 10 when the light adjusting panel 300 is enabled according to the first embodiment of the disclosure.

FIG. 6 illustrates a curve VAC indicating a relation between each location of the positive liquid crystal layer 370 of the light adjusting panel 300 in FIG. 5 in the first direction x and an equivalent refractive index of the positive liquid crystal layer 370, FIG. 7 illustrates the relationship between each view angle and the normalized brightness of the display apparatus 10 when the light adjusting panel 300 is enabled according to the first embodiment of the disclosure.

Figure 8:
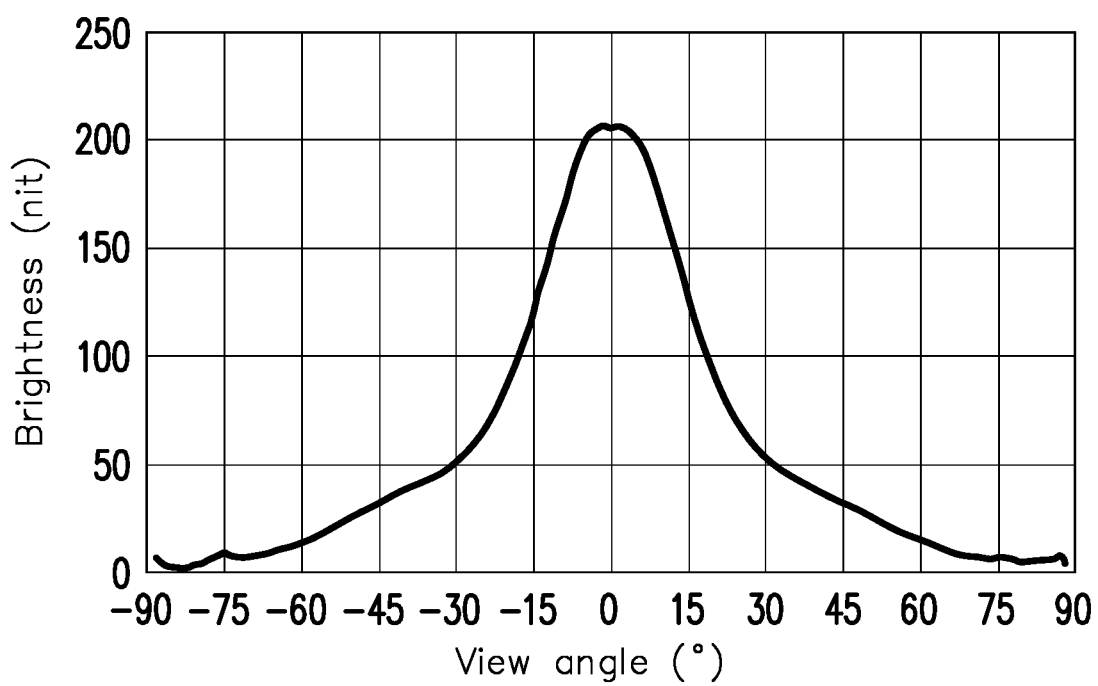
FIG. 8 illustrates the relationship between each view angle and a brightness of the display apparatus 10 in the first direction x when the light adjusting panel 300 is enabled according to the first embodiment of the disclosure.

FIG. 8 illustrates the relationship between each view angle and the brightness of the display apparatus 10 in the first direction x when the light adjusting panel 300 is enabled according to the first embodiment of the disclosure.

With reference to FIG. 1, FIG. 5, and FIG. 6, when the light adjusting panel 300 is enabled (i.e., the potential difference ΔV between the first electrode 320 and the second electrode 330 is significantly greater than 0 volt, and the electric field between the first electrode 320 and the second electrode 330 can significantly tilt the long axes 372a of the positive liquid crystal molecules 372 down), the synergy of the electric field between the first electrode 320 and the second electrode 330, the first vertical alignment film 340, and the second vertical alignment film 360 leads to a drastic change to the alignment of the positive liquid crystal molecules 372 of the positive liquid crystal layer 370 within a fairly short distance. That is to say, as shown by the curve VAC, the equivalent refractive index of the positive liquid crystal layer 370 of the light adjusting panel 300 at each location in the first direction x is changed drastically within a relatively short distance. At this time, after the illumination beam (not shown) coming from the privacy filter 200 passes through the light adjusting panel 300 in the aforesaid state, the divergence degree of the illumination beam is significantly changed by the light adjusting panel 300, so that the illumination beam transmitted to the display panel 400 becomes more divergent. Thus, as shown in FIG. 7 and FIG. 8, at the view angle of −90° to −45° and 45° to 90° in the first direction x, the brightness of the display apparatus 10 is significantly greater than 0 nit, and the display apparatus 10 is in a sharing mode.

When the light adjusting panel 300 is enabled, there is a potential difference ΔV between the first electrode 320 and the second electrode 330 of the light adjusting panel 300, and the display apparatus 10 is in the sharing mode. For instance, in the embodiment, $4V \leq \Delta V \leq 14V$, which should not be construed as a limitation in the disclosure.

FIG. 6 also illustrates a curve IPS indicating a relation between each location of the positive liquid crystal layer of the light adjusting panel in the first direction x and the equivalent refractive index of the positive liquid crystal layer according to a comparison example. The difference between the light adjusting panel (not shown) provided in the comparison example and the light adjusting panel 300 depicted in FIG. 5 lies in that the positive liquid crystal molecules of the light adjusting panel provided in the comparison example are horizontally aligned. That is, the first vertical alignment film 340 and the second vertical alignment film 360 of the light adjusting panel 300 in FIG. 5 are replaced with a first horizontal alignment film and a second horizontal alignment film to form the light adjusting panel provided in the comparison example. Here, an angle between a rubbing direction of the first horizontal alignment film and an extension direction of the first branch 322 (e.g., the second direction y) may be within a range from 0°-15°, and an angle between a rubbing direction of the second horizontal alignment film and the extension direction of the first branch 322 (e.g., the second direction y) may be within a range from 0°-15°; that is to say, the rubbing direction of the first horizontal alignment film and the rubbing direction of the second horizontal alignment film are substantially parallel to the extension direction of the first branch 322 (e.g., the second direction y).

With reference to FIG. 5 and FIG. 6, when there is a potential difference ΔV between the first electrode 320 and the second electrode 330 of the light adjusting panel 300 provided in the embodiment have (i.e., the light adjusting panel 300 provided in the embodiment is enabled), the curve VAC of the positive liquid crystal layer 370 indicates the relation between each location of the positive liquid crystal layer 370 of the light adjusting panel 300 in the first direction x and the equivalent refractive index of the positive liquid crystal layer 370 according to the embodiment; when the potential difference ΔV between the first electrode 320 and the second electrode 330 of the light adjusting panel in the comparison example is the same, the curve IPS of the positive liquid crystal layer of the light adjusting panel indicates the relation between each location of the positive liquid crystal layer of the light adjusting panel in the first direction x and the equivalent refractive index of the positive liquid crystal layer according to the comparison example.

With reference to FIG. 5 and FIG. 6, compared to the light adjusting panel provided in the comparison example, the equivalent refractive index of the positive liquid crystal layer 370 of the light adjusting panel 300 provided in the embodiment at each location in the first direction x is changed drastically within a relatively short distance, as shown by the curve VAC in FIG. 6. For instance, the curve IPS provided in the comparison example has only one peak and no valley within the distance corresponding to the width Ws of one gap S, while the curve VAC provided in the embodiment has a plurality of peaks and one valley within the distance corresponding to the width Ws of one gap S.

Figure 9:
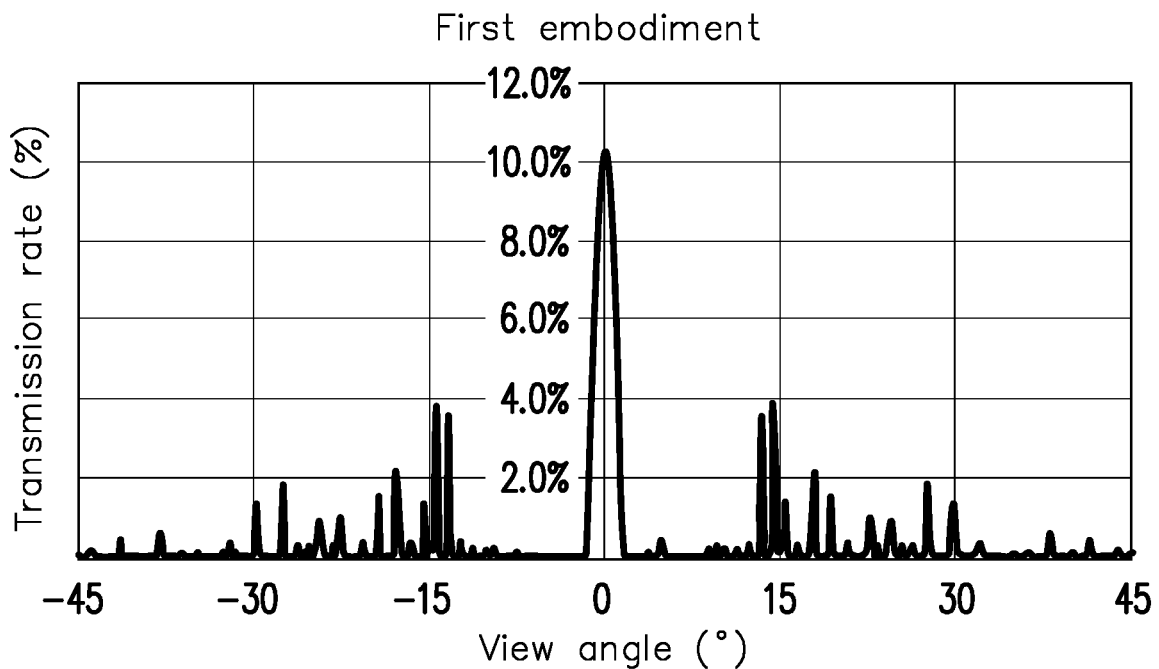
FIG. 9 illustrates the relationship between each view angle in the first direction x and a transmission rate of the light adjusting panel 300 according to the first embodiment of the disclosure.

FIG. 9 illustrates the relationship between each view angle in the first direction x and a transmission rate of the light adjusting panel 300 according to the first embodiment of the disclosure.

Figure 10:
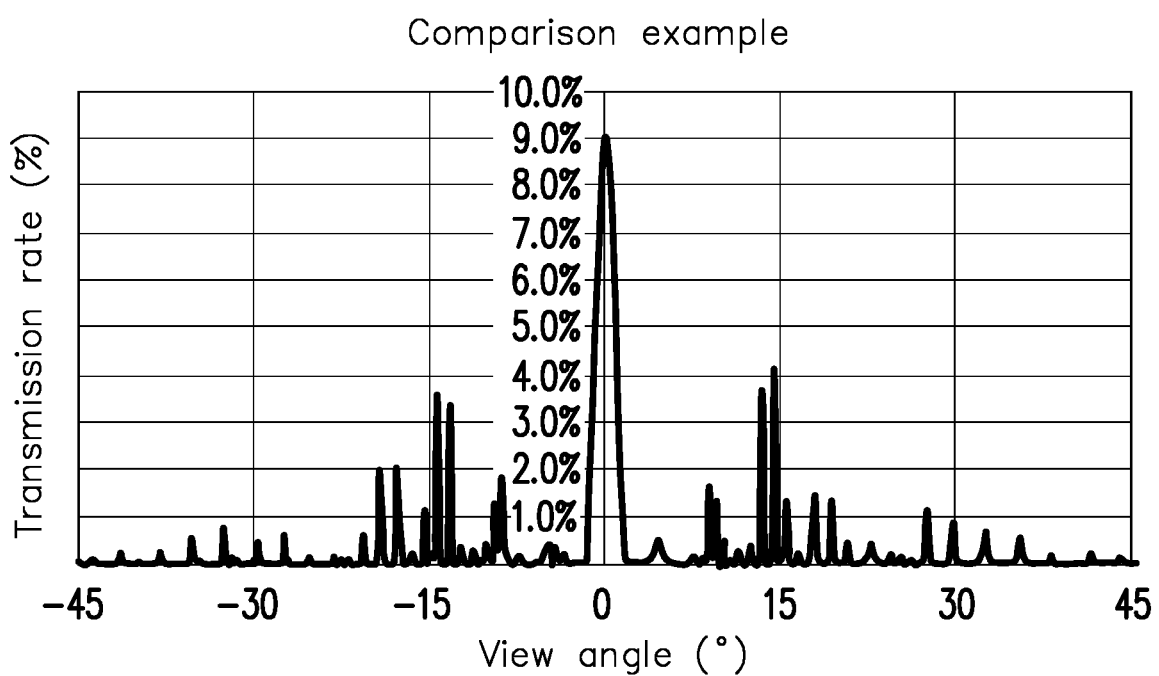
FIG. 10 illustrates the relationship between each view angle in the first direction x and a transmission rate of a light adjusting panel according to a comparison example.

FIG. 10 illustrates the relationship between each view angle in the first direction x and a transmission rate of a light adjusting panel according to a comparison example.

Figure 11:
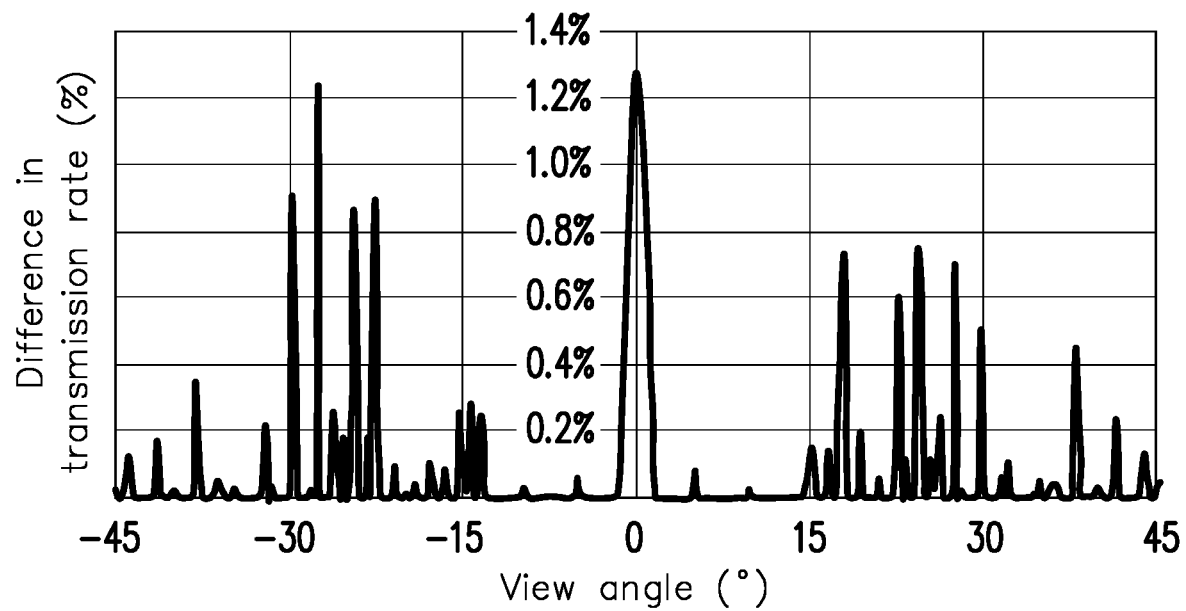
FIG. 11 illustrates a difference between the transmission rate of the light adjusting panel 300 of the first embodiment of the disclosure and the transmission rate of the light adjusting panel of the comparison example at various view angles in the first direction x.

FIG. 11 illustrates a difference between the transmission rate of the light adjusting panel 300 of the first embodiment of the disclosure and the transmission rate of the light adjusting panel of the comparison example at various view angles in the first direction x. FIG. 11 is obtained by subtracting the transmission rate at each view angle in FIG. 10 from the transmission rate at each view angle in FIG. 9.

With reference to FIG. 11, the difference in the transmission rate between the light adjusting panel 300 provided in the embodiment and the light adjusting panel provided in the comparison example mainly lies in the relatively large view angle (e.g., −45°-15° and 15°-45°). That is, when the potential difference between the first electrode 320 and the second electrode 330 of the light adjusting panel provided in the comparison example and the potential difference of the first electrode 320 and the second electrode 330 of the light adjusting panel 300 provided in the embodiment are significantly greater than 0 and equal, the light adjusting panel 300 provided in the embodiment has a larger transmission rate at a large view angle, and the light adjusting panel 300 provided in the embodiment has a better ability to diverge the illumination beam coming from the privacy filter 200 as compared to light adjusting panel provided in the comparison example. It can be proved that the vertically aligned light adjusting panel 300 provided in the embodiment achieves better effects of switching the display apparatus 10 between the privacy mode and the sharing mode in comparison with the horizontally aligned light adjusting panel provided in the comparison example. More importantly, the manufacturing steps of the light adjusting panel 300 provided in the embodiment are less while the reliability is better, which is conducive to the reduction of the manufacturing cost of the display apparatus 10 and the improvement of the reliability of the display apparatus 10.

It should be mentioned that some descriptions and the reference numbers applied in the embodiments below follow those provided in the previous embodiment, the same reference numbers serve to indicate the same or similar components, and the description of the same technical content is omitted. The description of the omitted parts may be referred to as those provided in the previous embodiment and will not be repeated hereinafter.

Figure 12:
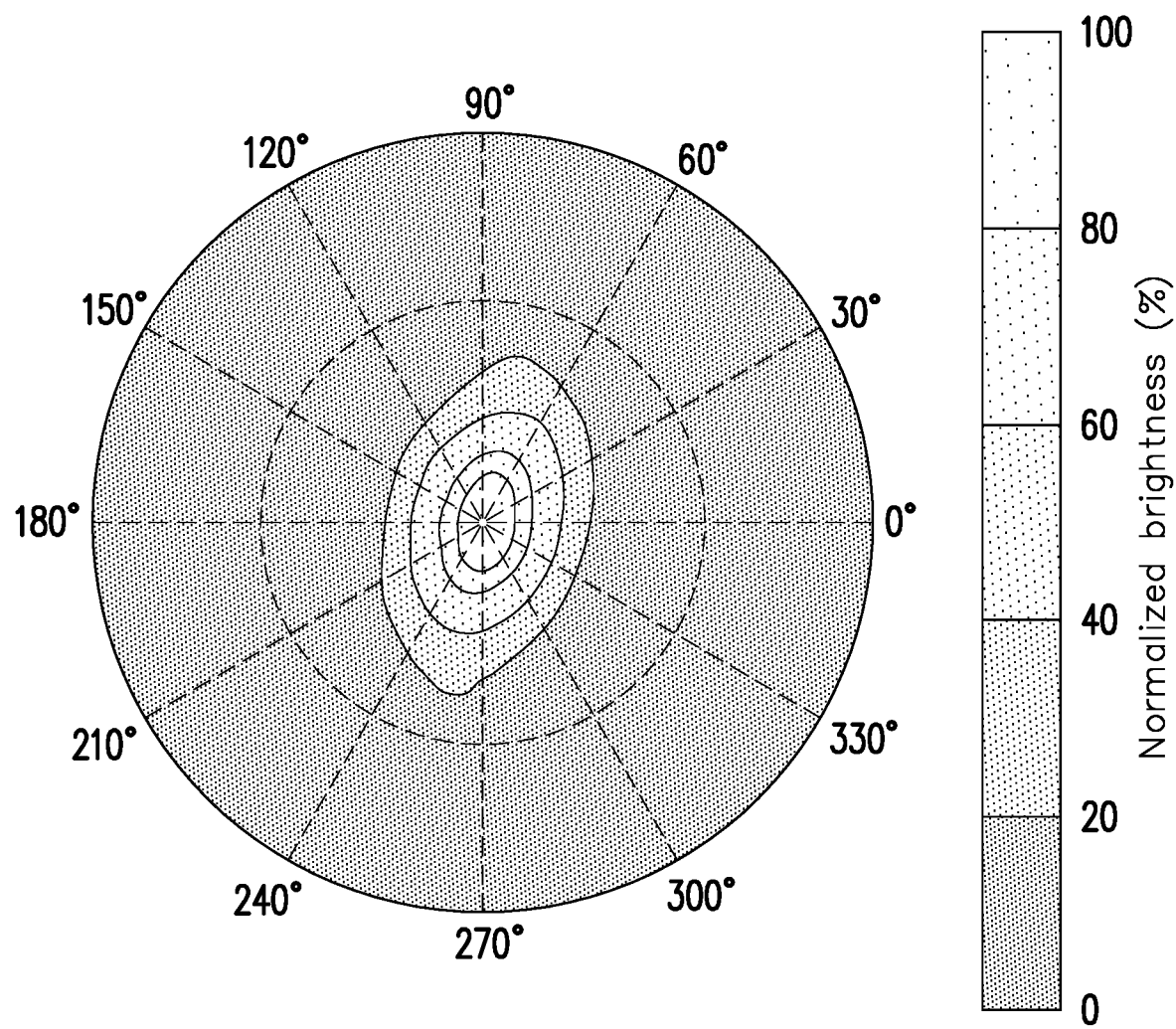
FIG. 12 illustrates the relationship between each view angle and a normalized brightness of a display apparatus when the light adjusting panel is disabled according to a second embodiment of the disclosure.

FIG. 12 illustrates the relationship between each view angle and a normalized brightness of a display apparatus when the light adjusting panel is disabled according to a second embodiment of the disclosure.

Figure 13:
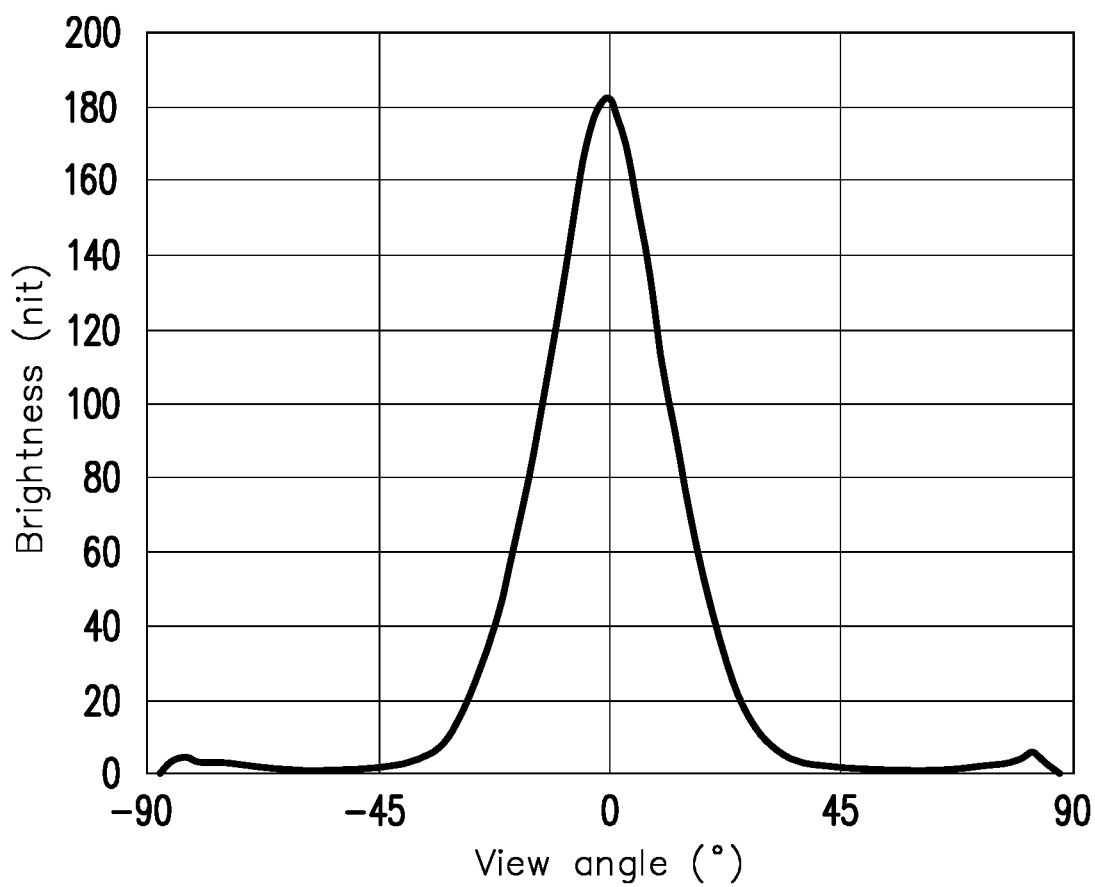
FIG. 13 illustrates the relationship between each view angle and a brightness of the display apparatus in the first direction x when the light adjusting panel is disabled according to the second embodiment of the disclosure.

FIG. 13 illustrates the relationship between each view angle and a brightness of the display apparatus in the first direction x when the light adjusting panel is disabled according to the second embodiment of the disclosure.

Figure 14:
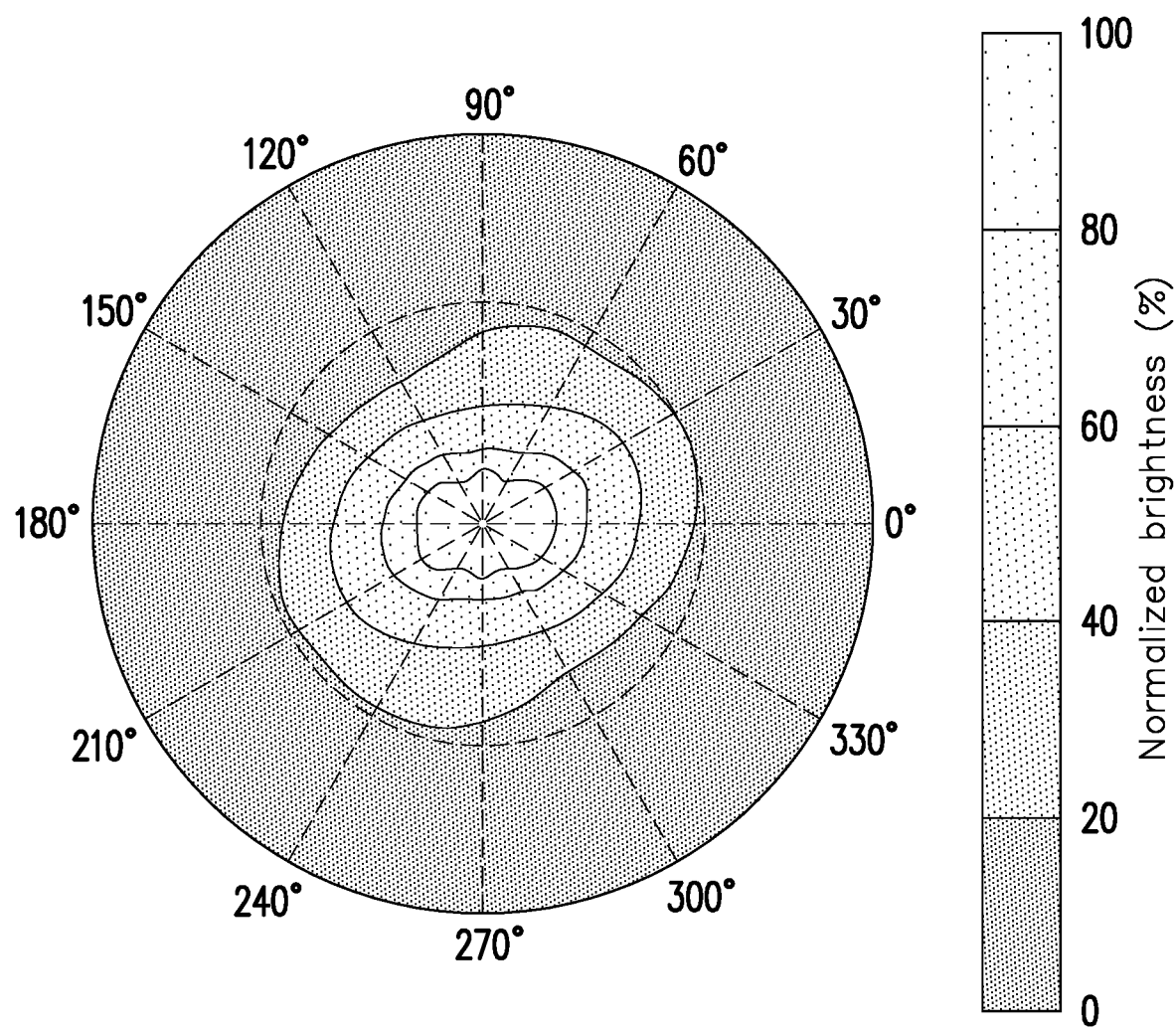
FIG. 14 illustrates the relationship between each view angle and the normalized brightness of the display apparatus when the light adjusting panel is enabled according to the second embodiment of the disclosure.

FIG. 14 illustrates the relationship between each view angle and the normalized brightness of the display apparatus when the light adjusting panel is enabled according to the second embodiment of the disclosure.

Figure 15:
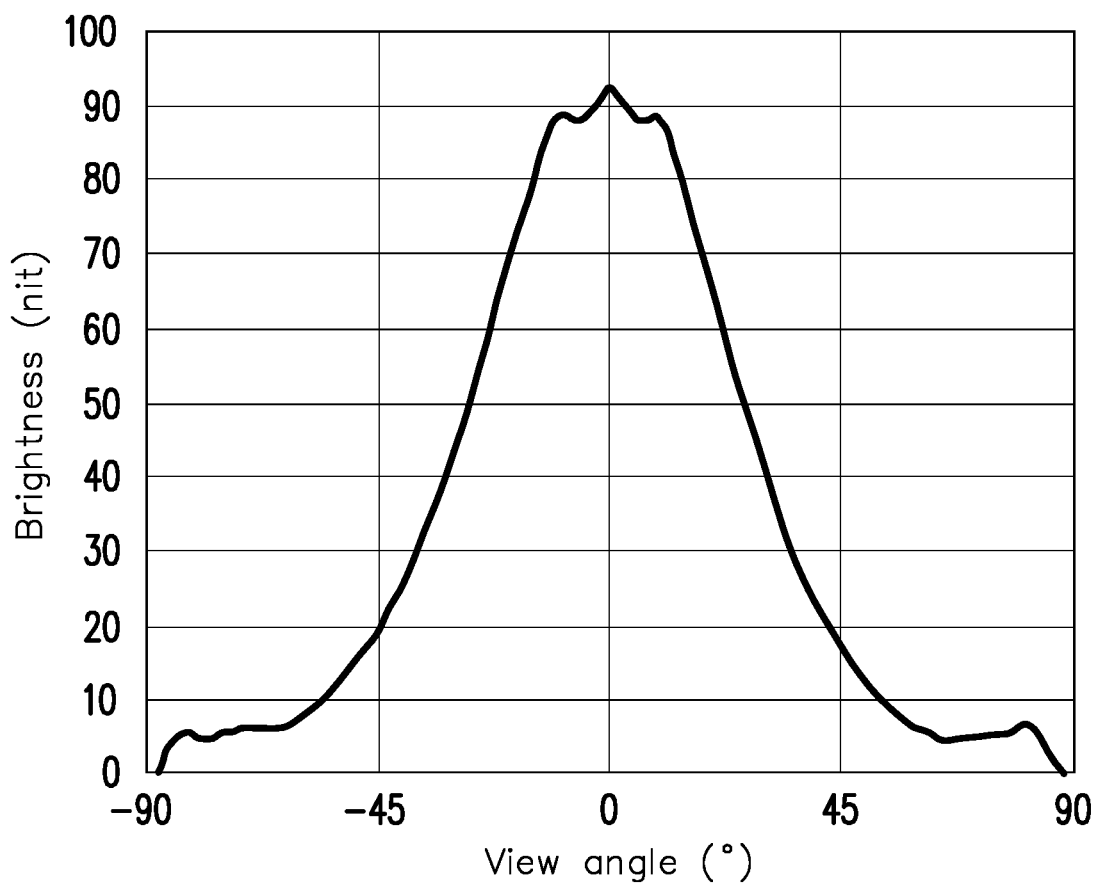
FIG. 15 illustrates the relationship between each view angle and a brightness of the display apparatus in the first direction x when the light adjusting panel is enabled according to the second embodiment of the disclosure.

FIG. 15 illustrates the relationship between each view angle and a brightness of the display apparatus in the first direction x when the light adjusting panel is enabled according to the second embodiment of the disclosure.

The display apparatus provided in the second embodiment (not shown) is similar to the display apparatus 10 provided in the first embodiment, while the difference therebetween merely lies in that the liquid crystal cell gap d (shown in FIG. 2 and FIG. 5) of the light adjusting panel 300 of the display apparatus 10 provided in the first embodiment is smaller than a liquid crystal cell gap of the light adjusting panel of the display apparatus provided in the second embodiment. That is, the liquid crystal cell gap of the light adjusting panel of the display apparatus provided in the second embodiment is larger. For instance, the liquid crystal cell gap d (shown in FIG. 2 and FIG. 5) of the light adjusting panel 300 of the display apparatus 10 provided in the first embodiment 10 may be 9 μm, and the liquid crystal cell gap of the light adjusting panel of the display apparatus provided in the second embodiment is 20 μm.

With reference to FIG. 3, FIG. 4, FIG. 7, and FIG. 8 illustrating the first embodiment and FIG. 12 to FIG. 15 illustrating the second embodiment, the effect of switching the display apparatus in the second embodiment between the privacy mode and the sharing mode is better than the effect of switching the display apparatus 10 provided in the first embodiment between the two modes. That is to say, when the liquid crystal cell gap d of the light adjusting panel 300 is larger, the effect of switching the light adjusting panel 300 between the privacy mode and the sharing mode is better.

Figure 16:
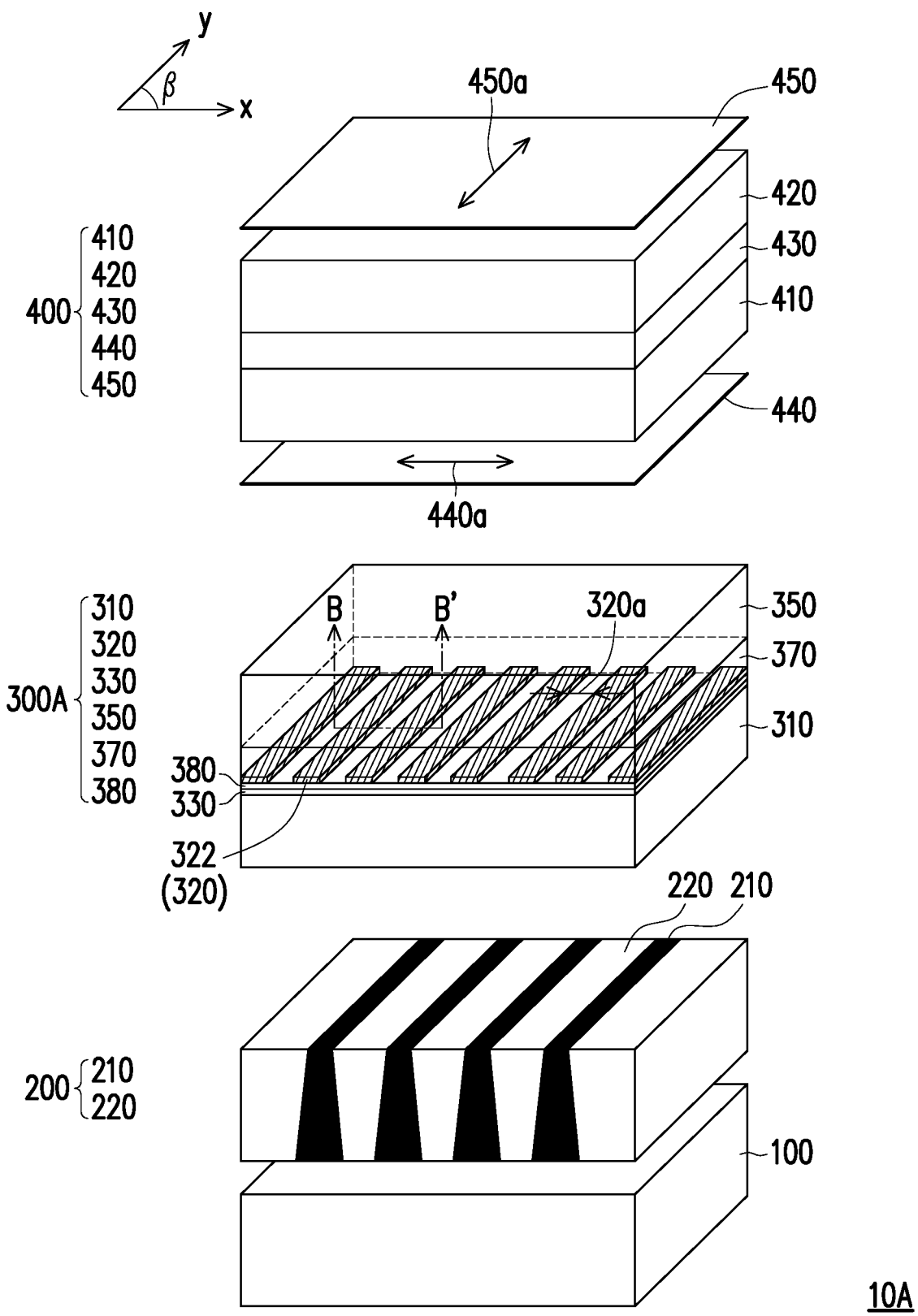
FIG. 16 is a schematic three-dimensional view of a display apparatus 10A according to a third embodiment of the disclosure.

FIG. 16 is a schematic three-dimensional view of a display apparatus 10A according to a third embodiment of the disclosure.

Figure 17:
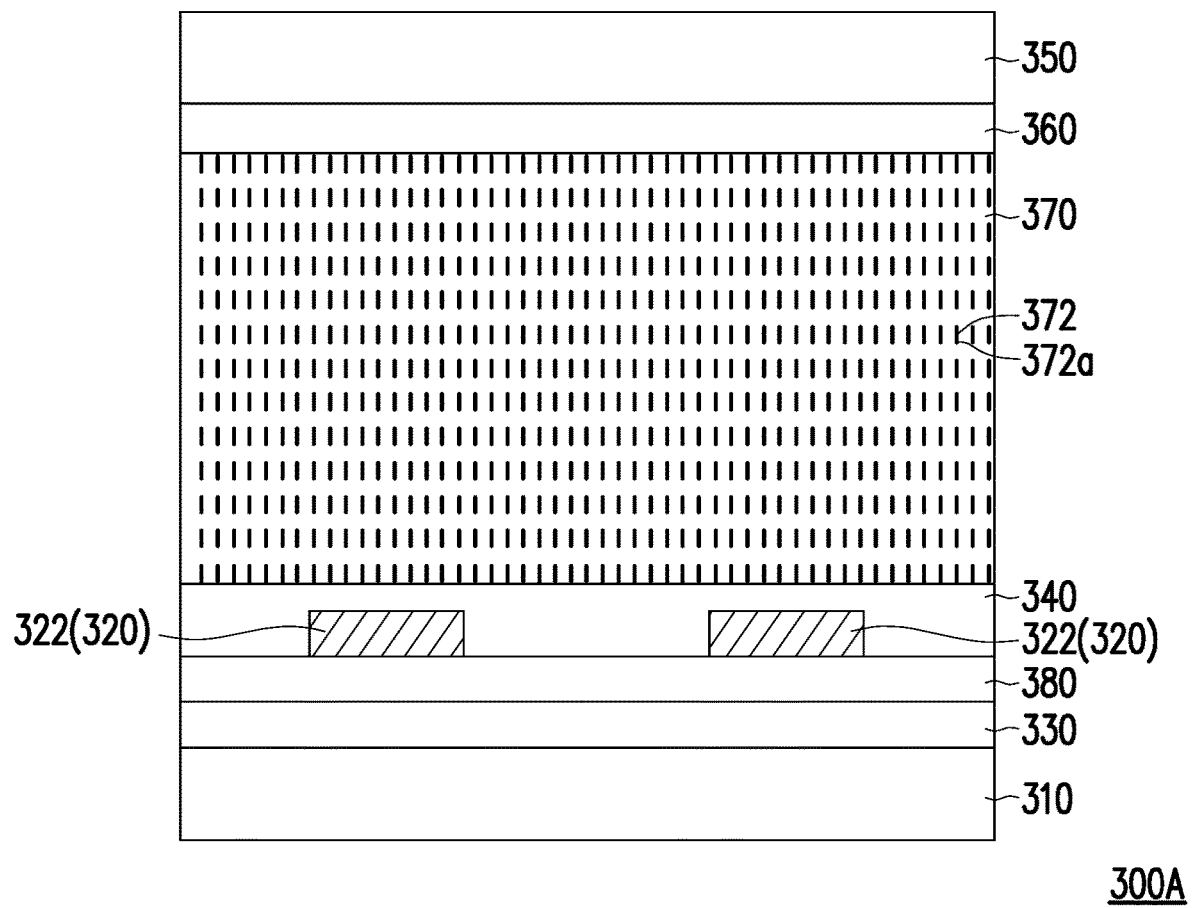
FIG. 17 is a schematic cross-sectional view of the light adjusting panel 300A according to the third embodiment of the disclosure.

FIG. 17 is a schematic cross-sectional view of the light adjusting panel 300A according to the third embodiment of the disclosure.

FIG. 17 corresponds to a line segment B-B' in FIG. 16. The first vertical alignment film 340 and the second vertical alignment film 360 in FIG. 17 are omitted in FIG. 16.

The display apparatus 10A depicted in HQ, 16 is similar to the display apparatus 10 depicted in FIG. 1, while the difference therebetween lies in that the light adjusting panel 300A of the display apparatus 10A depicted in FIG. 16 and the light adjusting panel 300 of the display apparatus 10 depicted in FIG. 1.

With reference to FIG. 16 and FIG. 17, specifically, in the embodiment, the second electrode 330 is a complete electrode layer, and the light adjusting panel 300A further includes an insulation layer 380 that is disposed on the second electrode 330, and the first branches 322 of the first electrode 320 are disposed on the insulation layer 380. In short, the light adjusting panel 300A provided in the embodiment is a fringe field switching (FFS) panel, and the light adjusting panel 300 provided in the first embodiment is an in-plane switching (IPS) panel.

The way to switch the display apparatus provided in the embodiment 10A to the privacy/sharing mode is the same as or corresponds to the way to switch the display apparatus 10 and thus will not be further described hereinafter.

It will be apparent to those skilled in the art that various modifications and variations can be made to the disclosed embodiment without departing from the scope or spirit of the disclosure. In view of the foregoing, it is intended that the disclosure covers modifications and variations provided that they fall within the scope of the following claims and their equivalents.

What is claimed is:

1. A display apparatus, comprising:
a backlight source;
a privacy filter, disposed on the backlight source and including a plurality of light blocking structures separated from each other;
a light adjusting panel, disposed on the privacy filter, wherein the light adjusting panel comprises:
a first substrate;
a first electrode and a second electrode, disposed on the first substrate, wherein the first electrode has a plurality of first slits, and a plurality of orthogonal projections of the first slits on the first substrate overlap an orthogonal projection of the second electrode on the first substrate;
a first vertical alignment film, disposed on the first substrate;
a second substrate, disposed opposite to the first substrate;
a second vertical alignment film, disposed on the second substrate; and
a positive liquid crystal layer, disposed between the first vertical alignment film and the second vertical alignment film; and
a display panel, disposed on the light adjusting panel, wherein the display panel comprises:
a third substrate;
a fourth substrate disposed opposite to the third substrate;
a non-self-luminous display medium layer disposed between the third substrate and the fourth substrate; and
a polarizer, disposed between the non-self-luminous display medium layer and the positive liquid crystal layer of the light adjusting panel,
wherein an angle between one of the light blocking structures of the privacy filter and a transmission axis of the polarizer of the display panel is β, and 0°≤β≤90°; and the first electrode of the light adjusting panel has a plurality of first branches defining the first slits, an angle between one of the light blocking structures of the privacy filter and one of the first branches of the first electrode of the light adjusting panel is α, and 0°≤α≤10°.

2. The display apparatus according to claim 1, wherein 80°≤β≤90°.

3. The display apparatus according to claim 1, wherein the the second electrode of the light adjusting panel has a plurality of second branches, and the first branches and the second branches are alternately arranged in a first direction.

4. The display apparatus according to claim 3, wherein a width of the first branch in the first direction and a width of the second branch in the first direction are substantially the same.

5. The display apparatus according to claim 3, wherein a width of the first branch is substantially equal to 3 μm.

6. The display apparatus according to claim 3, wherein a width of the second branch is substantially equal to 3 μm.

7. The display apparatus according to claim 3, wherein a plurality of gaps exists between the first branches and the second branches, each of the gaps is located between one of the first branches and one of the second branches adjacent to each other, and widths of the gaps in the first direction are substantially the same.

8. The display apparatus according to claim 7, wherein in a case that the light adjusting panel is enabled, a curve indicating a relation between each location of the positive liquid crystal layer in the first direction and an equivalent refractive index of the positive liquid crystal layer has a plurality of peaks and a valley within a distance equal to the width of the gap.

9. A display apparatus, comprising:
a backlight source;
a privacy filter, disposed on the backlight source and including a plurality of light blocking structures separated from each other;
a light adjusting panel, disposed on the privacy filter, wherein the light adjusting panel comprises:
a first substrate;
a first electrode and a second electrode, disposed on the first substrate, wherein the first electrode has a plurality of first slits, and a plurality of orthogonal projections of the first slits on the first substrate overlap an orthogonal projection of the second electrode on the first substrate;
a first vertical alignment film, disposed on the first substrate;
a second substrate, disposed opposite to the first substrate;
a second vertical alignment film, disposed on the second substrate; and
a positive liquid crystal layer, disposed between the first vertical alignment film and the second vertical alignment film; and
a display panel, disposed on the light adjusting panel, wherein the display panel comprises:
a third substrate;
a fourth substrate disposed opposite to the third substrate;
a non-self-luminous display medium layer disposed between the third substrate and the fourth substrate; and
a polarizer, disposed between the non-self-luminous display medium layer and the positive liquid crystal layer of the light adjusting panel,
wherein an angle between one of the light blocking structures of the privacy filter and a transmission axis of the polarizer of the display panel is β, and 0°≤β≤90°, and
wherein a bi-refractive index of a positive liquid crystal molecule of the positive liquid crystal layer is Δn, and Δn is substantially equal to 0.25 when a temperature is at 25° C. and a wavelength is 589.3 nanometers.

10. The display apparatus according to claim 9, wherein the positive liquid crystal layer has a positive liquid crystal molecule, and in a case that the light adjusting panel is disabled, the display apparatus is in a privacy mode, and a long axis of the positive liquid crystal molecule is substantially perpendicular to the first substrate.

11. The display apparatus according to claim 9, wherein in a case that the light adjusting panel is enabled, the display apparatus is in a sharing mode, a potential difference between the first electrode and the second electrode of the light adjusting panel is ΔV, and 4V≤ΔV≤15V.

12. The display apparatus according to claim 11, wherein 4V≤ΔV≤12V.

13. The display apparatus according to claim 12, wherein $7V \leq \Delta V \leq 8V$.

14. The display apparatus according to claim 9, wherein in a case that the light adjusting panel is disabled, the display apparatus is in a privacy mode, and a first brightness of the display apparatus at a first view angle of 45° or −45° is close to 0 nit.

15. The display apparatus according to claim 9, wherein in a case that the light adjusting panel is disabled, the display apparatus is in a privacy mode, and a ratio of a first brightness of the display apparatus at a first view angle of 45° or −45° to a second brightness of the display apparatus at a second view angle of 0° is less than or equal to 1%.

16. The display apparatus according to claim 9, wherein the second electrode is a complete electrode layer.

17. The display apparatus according to claim 16, wherein the light adjusting panel further includes an insulation layer disposed on the second electrode, and the first electrode is disposed on the insulation layer.

* * * * *